(No Model.)　　　　　　　　　　　　　　　　4 Sheets—Sheet 4.

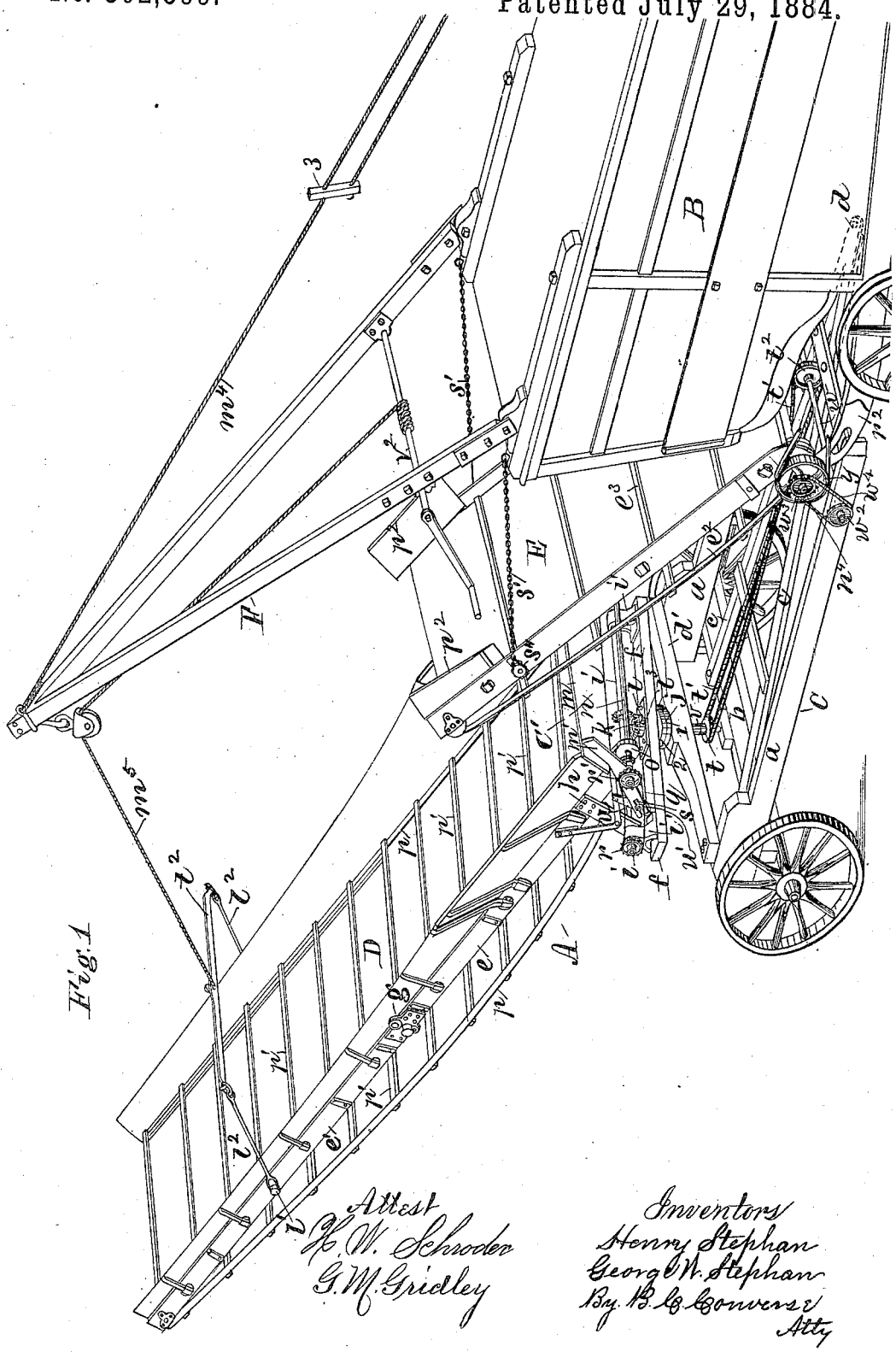

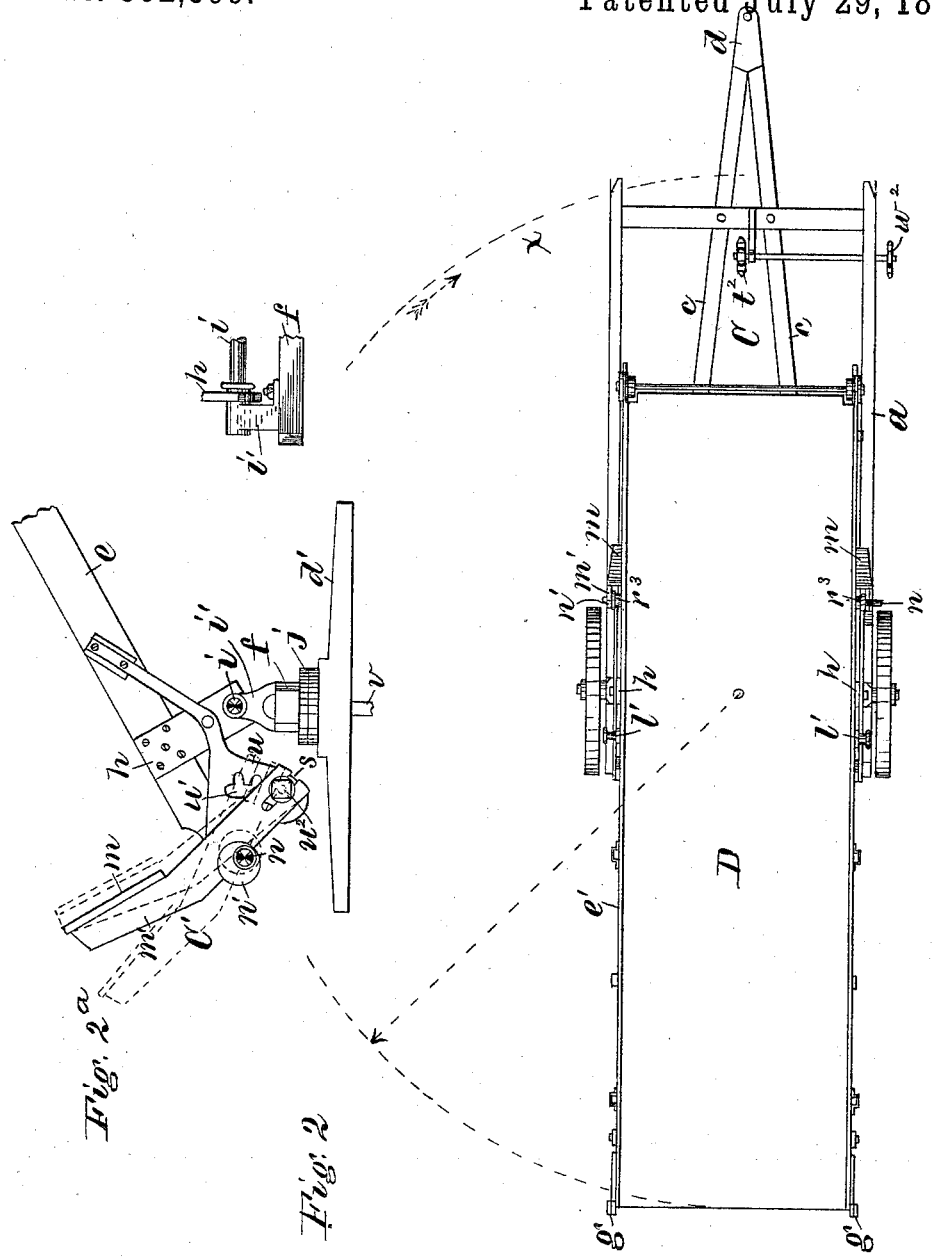

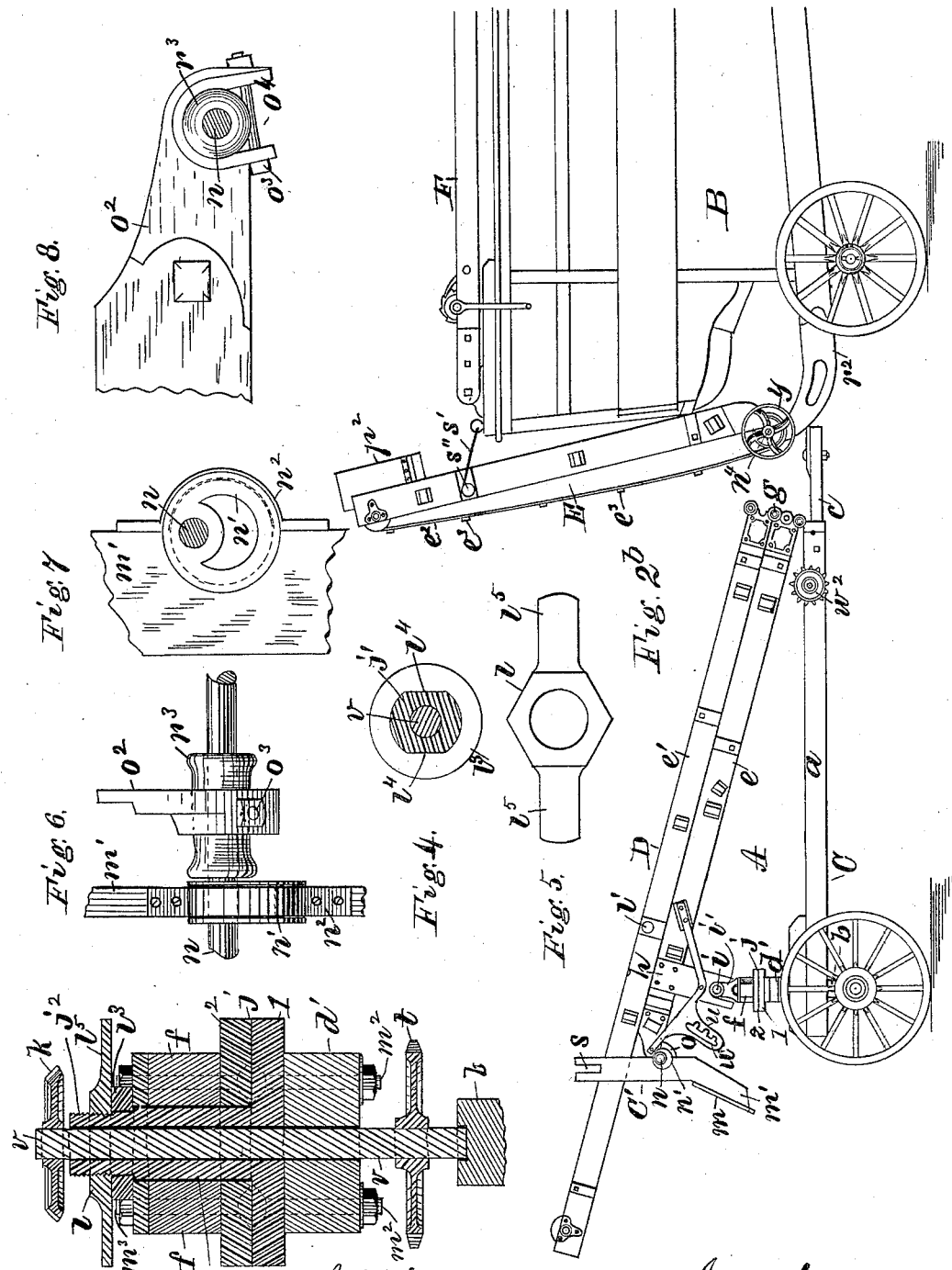

H. & G. W. STEPHAN.
STRAW STACKER.

No. 302,599.　　　　　　　　Patented July 29, 1884.

Inventors.
Henry Stephan
George W. Stephan
By B. C. Converse
Atty

Attest
M. M. Converse
G. M. Gridley

UNITED STATES PATENT OFFICE.

HENRY STEPHAN AND GEORGE W. STEPHAN, OF SPRINGFIELD, OHIO.

STRAW-STACKER.

SPECIFICATION forming part of Letters Patent No. 302,599, dated July 29, 1884.

Application filed March 19, 1884. (No model.)

*To all whom it may concern:*

Be it known that we, HENRY STEPHAN and GEORGE W. STEPHAN, both citizens of the United States, residing at Springfield, in the county of Clark and State of Ohio, have jointly invented certain new and useful Improvements in Straw-Stackers; and we do declare the following to be a full, clear, and exact description of the invention, such as will enable others skilled in the art to which it appertains to make and use the same, reference being had to the accompanying drawings, and to letters and figures of reference marked thereon, which form a part of this specification.

Our invention relates to improvements in straw-stackers.

Our invention relates to that class of straw-stackers which are pivoted to and transported upon a truck in rear of the thrashing-machine, and suspended from a derrick attached to the latter, and which, when in part detached from the truck, can be used independently thereof in conveying the straw from a thrashing-machine located and operated upon the floor of a bank-barn.

Our invention consists in certain details, which will be hereinafter described, and particularly pointed out in the claims.

Figure 9:
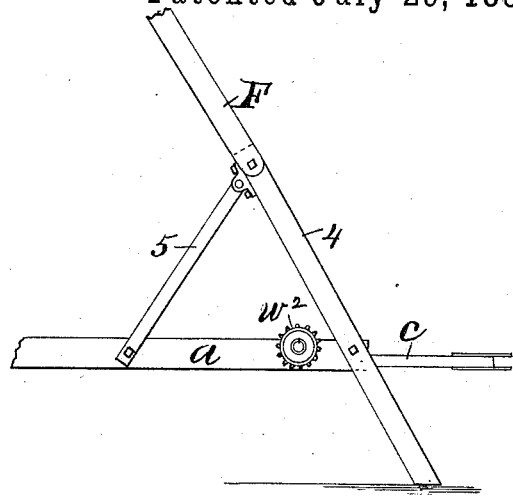
Figure 12:
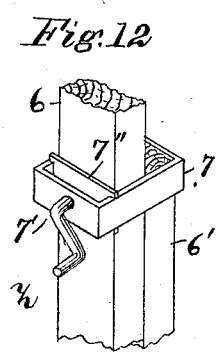
Figure 10:
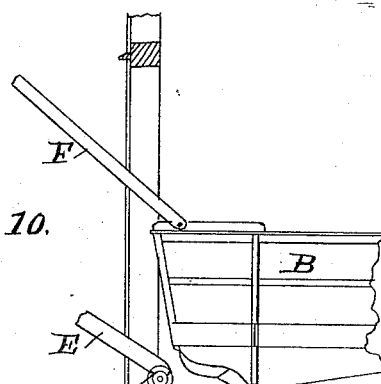
Figure 11:
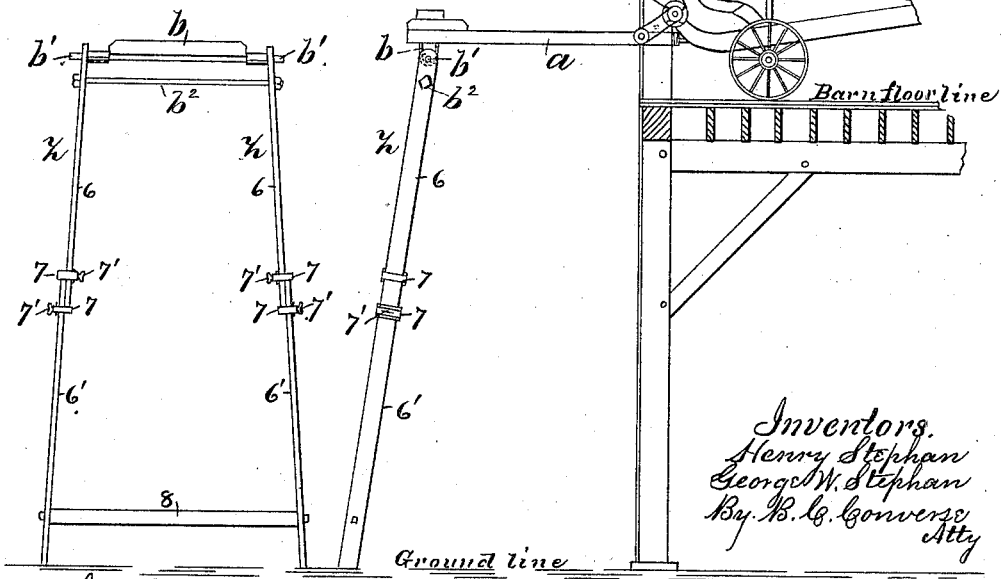

In the drawings, Figure 1 is an isometric view of our improved straw-stacker on its truck, as attached to a thrashing-machine. Fig. 2 represents the movement of the stacker in folding the same. Fig. 2$^a$ is a detail view of the vibrator and its connection. Fig. 2$^b$ shows the stacker when folded and ready for transportation. Fig. 3 is a vertical section through the pivotal parts of the stacker, and its connections with the truck. Figs. 4 and 5 are details of the same. Figs. 6 and 7 are details of the vibrating section. Fig. 8 is a side view of a part of the detail shown in Fig. 6. Fig. 9 shows the manner of supporting the front end of the truck-bed when the latter is detached from the thrasher. Fig. 10 is a view of a thrasher elevated upon a bank-barn floor, with the truck-bed attached thereto. The latter is supported upon adjustable legs, and has its wheels removed. Fig. 11 is a view (from the left) of the adjustable legs seen in Fig. 10. Fig. 12 is a view of the clamp connecting the leg-sections.

A, Fig. 1, is the straw-elevator, which consists of the sections $e$ and $e'$, which form the chute D, over which runs the endless straw-carrier. The chute D is pivoted over the axle of the truck about two feet from its front end; the object being to allow it to extend entirely across the frame of the truck when the straw-elevator is turned at right angles to the latter, to catch the straw from the machine, which otherwise would fall down through the space left between the foot of the stacker (when pivoted at its end) and the outside of the truck. The pivotal parts of the straw-elevator are shown in the enlarged vertical section, Fig. 3, and form a part of our invention. These will be hereinafter described. The foot of the straw-elevator section $e$ has legs $h$ bolted to each side about two feet from the end of the same. These have a fork at their lower ends, which straddles the cylindrical part of box $i'$ of shaft $i$, seen on the upper bolster, $f$, of the truck C.

At the end of section $e$, forward of its legs $h$, is pivoted a vibrating device, C', which consists of a broad board, $m$, extending across the front end of the chute D. It stands nearly perpendicularly to the line of the straw-elevator when operating, as seen in Fig. 1, and is bolted on the front of the two side bars, $m'$, which are pivoted at their lower front edges (below the middle) upon the eccentrics $n'$ on the revoluble shaft $n$, as seen in Figs. 2$^a$, 2$^b$, 6, and 7. The eccentrics operate in the yoke-boxes $n^2$, attached to the side bars, $m'$, of the vibrator.

Just inside of the eccentrics are spools $n^3$ on the shaft $n$. These are clamped in a clip-iron, $o^2$, on the end of each side rail of stacker-section $e$. This clip-iron consists of a downwardly-bent hinging-bracket, $o^4$, on the end of plate $o^2$. A bolt, $o^3$, extending through the ends of this bracket below the spool $r^3$, retains the latter in the clip, and holds the shaft and vibrator C' in connection with straw-elevator section. By this fastening the shaft and vibrator may be detached when required. The lower ends of the side bars, $m'$, have forks $s$ therein, and are connected through the slot $u'$ with the plate $u$ (seen in Figs. 2$^a$ and 2$^b$) by bolts and nuts $u^2$, whereby the vibrator is made adjustable. The plate $u$ is a broad, flat plate extending downward and forward in front of legs $h$, and is connected with the latter and side rails of $e$ by arms extending therefrom, which are bolted thereto. It has a long slot, $u'$, with notches in one side, in which the bolt $u^2$ rests when the vibrator is in adjustment and in its operative position, as shown in Fig. $2^a$. The dotted lines in this figure show the movement of the vibrator, which is thrown forward at each revolution of the shaft $n$ and pushes the straw up onto the carrier. This shaft is operated by a chain-belt connecting the sprocket-wheel $r'$ with the sprocket-wheel $r$ on the end of shaft $i$ over the axle of the truck. The latter shaft is driven by a pair of bevel gears, one on the middle of the same, and the driver $k$ of the latter on the upper end of a vertical shaft, $v$, which is stepped into a block bearing on the axle $b$ of the truck C, as seen in Fig. 1. The lower bolster, $d'$, has bolted thereon at the center the hollow vertical spindle $j'$, which has a broad-flanged circular base, 1. On the top of this is a broad circular plate, 2, which is bolted to the under side of the upper bolster, $f$, and, in connection with flange 1 of the spindle $j'$, forms the turn-table $j$ of the device. The bolts $m^2$ and $m^3$ in both plates have their heads countersunk in the plates which they hold, as shown in dotted lines, and extend through the bolsters in opposite directions. On the top of the upper bolster is a long iron plate through which the bolts $m^3$ extend, and on this is placed a washer, $l^3$. (Seen also in the detail Fig. 4.) It will be noticed, by reference to this latter figure, that the spindle has two opposite sides flattened, and that the washer has its hole formed to fit this part of the spindle, to prevent it from turning. The end of the spindle above the washer is threaded, and a nut, $l$, with arms $l^5$ on opposite sides, is screwed down upon the washer, to lock the bolsters and plates tightly together when the stacker is adjusted to any desired position for operating.

The vertical shaft $v$ (before noticed) extends from the block $b$ on the axle of the truck through the bolster $d'$ and spindle $j'$, and has upon its lower end, between block $b$ and the lower bolster, a horizontal sprocket-wheel, $t$, which is connected by chain $t'$ with a vertically-running sprocket-wheel, $t^2$, on a horizontal shaft, $w$, at the front end of the truck-frame. This shaft has on the outside end a sprocket-wheel, $w^2$, which is in turn connected by a chain with a sprocket-wheel, $w^3$, on the end of the driving-shaft $n^4$, outside of the pulley $y$ on the same shaft, which is connected with the usual drive-pulley on the rear part of the thrasher.

The thrasher-section E of the straw-elevator is connected with the machine in the usual manner at the foot end. At its top end two short boards, $p^2$ $p^2$, are attached—one on each side—inside of the side rails. These boards are both inclined inward from the foot to their top ends, and extend a little beyond the end of the section. The object of these converging boards is to guide the straw toward the central longitudinal line of the chute D, reducing the stream of the same in width at the same time, and thereby preventing it from being thrown off or scattered.

In folding the straw-elevator, Figs. 1, 2, $2^a$, $2^b$, and 3 are referred to. The bolt $u^2$ of the vibrator C′ is first removed and the board $m$ swung downward, as seen in Fig. $2^b$. Bolts in the hinges $g$, connecting sections $e$ and $e'$, are then withdrawn and the end section, $e'$, folded down upon section $e$ to the position seen in Fig. 2. The lock-nut $l$ on the spindle-pivot $j'$ is now loosened, and the straw-elevator is rotated horizontally on the latter in the direction of the arrow, (seen in the circular dotted line $x$,) reversing the ends of the sections and folding them up on the truck into the position shown in Fig. $2^b$, ready for transportation. The derrick F, used with the mounted straw-elevator, is laid back on the top of the thrasher, as shown in the same figure, before mentioned.

The figures 9 to 12 show leg-supports for the straw-elevator and means for adjusting them in height.

Fig. 9 represents the truck-bed detached from the thrasher, and supported at its front end upon legs 4, which are detachably bolted to the ends of bed-timbers $a$ at the proper height from the ground, and incline upward and backward a sufficient height above the truck, and have the lower ends of the derrick-timbers pivoted thereto at the top. A brace, 5, extends from the top of leg 4 down to the bed-timber $a$ and is held to the latter by a bolt. This brace is pivotally attached to leg 4, and can be folded down upon the latter when not in use. This short leg-support for the truck and straw-elevator is designed to be used when the thrasher stands at some distance from the latter when being operated. The derrick supports the chute, as in the other mode just described.

In thrashing and stacking from an elevated barn-floor, the wheels of the truck are removed and the frame is elevated on the outside of the barn, as seen in Fig. 10. The front end is attached, as usual, to the thrasher, and the rear end, which supports the straw-elevator, is held up by legs Z. These consist of the sections 6 and 6′, which overlap each other in the middle, and are held in adjustment by clamp-bands 7, through which they extend at their lapped parts. A screw, 7′, extending through one end of the band, engages a loose plate, 7″, which it clamps against the leg-section, retaining them in adjustment. The legs Z have their top ends provided with holes, and they are slipped over the spindles $b'$ of the truck-axle, as seen in Figs. 10 and 11. Cross-bars $b^2$ and 8 connect the top and bottom ends of the legs Z.

The straw-elevator A can be pivoted, as usual, on the rear end of the truck-frame, and operated from the thrasher inside the barn, the derrick being projected from the thrasher, as seen in Fig. 10. The straw-elevator is set in the manner shown in Fig. 1, being suspended by the derrick F, which is held erect by the guy-rope $m^4$, the chute D being suspended by the rope $m^5$, which latter is wound up and unwound by windlass $v^2$, pivoted to the outside of the two legs of the derrick. In adjusting the latter, a block, 3, on rope $m^4$ is used. This block is similar to that used in bracing tents, and is attached upon the rope in the same manner. In operating, the straw is blown from the thrasher B over the section E, passing between boards $p^2$ at the upper end of the latter, where it is narrowed in width, and directed upon the foot of the stacker A. Here the vibrator C' catches and forces it upward upon the carrier $p$ of chute D. At each revolution of shaft $n$ the eccentrics $n'$ throw the board $m$ forward, as seen in the dotted lines. Dotted lines are also introduced to show the adjustment of the vibrator, which is made in proportion to the inclination or angle given to the chute D, the board $m$ being set nearer to a perpendicular as the discharge end of chute D is elevated.

The block 3 for retaining the tension of ropes $m^4$, which support the derrick, (before referred to,) is made somewhat longer than those in ordinary use for tent-ropes. Two holes are bored through the block (which is rectangular in cross-section) in the same direction—one, however, being at a little distance from one end to allow the end of the block to project far enough so that it may be struck from the upper side to loosen the rope in taking down the derrick. The end of the rope is held by a knot in one end of the block, while the main strand passes through the hole about one-third the length of the block from its opposite end.

We are aware that a straw-elevator pivoted upon a turn-table on a truck and suspended from a derrick is not new, and we do not claim these features as our invention; but a straw-elevator constructed with a lower and an upper bolster supporting the straw-elevator, pivoted as described, which allows it to be turned entirely around in a horizontal plane upon its axis, so as to reverse the ends of the stacker-sections, and thus folded upon the truck, we believe to be new.

We therefore claim—

1. In a straw-stacker, the combination, with the straw-elevator and truck, constructed with a lower and an upper bolster supporting the straw-elevator, of the pivoted device connecting the former with the latter, consisting of a hollow spindle extending from the lower bolster of said truck through the upper bolster, a plate attached to the under side of the latter inclosing said spindle, and adapted to rotate on the base of the same between said bolsters, said spindle being flattened upon its opposite sides above the upper bolster, a washer formed to fit thereon, and a nut with projecting arms for locking the stacker in position, as set forth.

2. The combination of the truck-frame, the straw-elevator, the lower and upper bolster supporting the latter, the hollow spindle on which said straw-elevator is pivoted, the lock-nut for locking the latter in any desired position, the gear-shaft extending through said hollow spindle and supported in a vertical position thereby, and means connecting said gear-shaft with the straw-elevator and with the driving mechanism of the thrasher, as set forth.

3. In a straw-stacker, with its straw-elevator sections hinged together and adapted to be folded one upon the other, the combination therewith of the truck-frame, a lower and an upper bolster supporting said straw-elevator, and the hollow spindle connecting said bolsters upon which said straw-elevator is pivoted, the parts being relatively so arranged that said sections, as folded one upon the other, may be rotated half around upon the said spindle, and the free end rested upon said truck-frame, as set forth.

4. In a straw-stacker, the combination of the hollow spindle $j'$ with base 1, bolster $d'$ to which said base is secured, plate 2, inclosing said spindle and adapted to rotate on base 1, bolster $f$, having a top plate thereon, and to which said plate 2 is secured, washer $l^2$, formed to fit said spindle, and nut $l$ with arms $l^5$, as and for the purpose hereinbefore set forth.

5. The combination, with shaft $n$, eccentrics $n'$ thereon, and the straw-carrier $p$, driven by said shaft, of the vibrator C', pivoted upon said eccentrics and operated thereby to force the straw forward up said carrier, as set forth.

6. In a straw-stacker, the combination, with the straw-carrier and means for driving the same, of a driving-shaft, eccentrics thereon, a vibrator pivoted upon said eccentrics, and means for adjusting the same, whereby the straw is forced up the carrier by the oscillating movement of said vibrator, as set forth.

7. In a straw-carrier, the combination, with sections $e$ and $e'$, carrier $p$, shaft $n$, and eccentrics $n'$ $n'$, of vibrator C', having board $m$, side bars, $m'$, with slots $s$, plate $u$, having slot $u'$ therein, with notches upon one side, and bolt and nut $u^2$, whereby said vibrator is adjusted to the stacker, and, when said bolt is removed, may be folded with the stacker, as described.

8. In combination, the side rail of section $e$, clip-iron $o^2$, formed with downwardly-bent hinging-bracket $o^4$, attached to said side rail, spools $r^3$, shaft $n$, on which the spools are pivoted, and bolt and nut $o^3$, securing the plate $o^2$ to said spools, substantially as set forth.

In testimony whereof we affix our signatures in presence of two witnesses.

HENRY STEPHAN.
GEORGE W. STEPHAN.

Witnesses:
B. C. CONVERSE,
G. M. GRIDLEY.